M. V. Trask,
Flesh Hook and Fork.
N° 39,534. Patented Aug. 11, 1863.
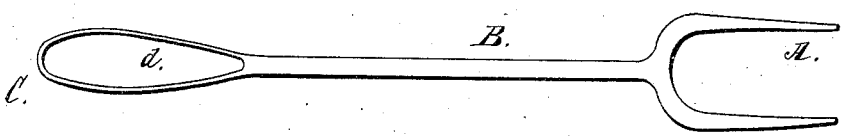
Fig: 1.
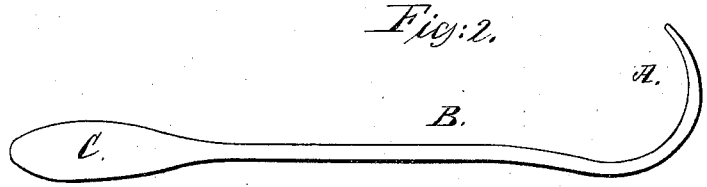
Fig: 2.
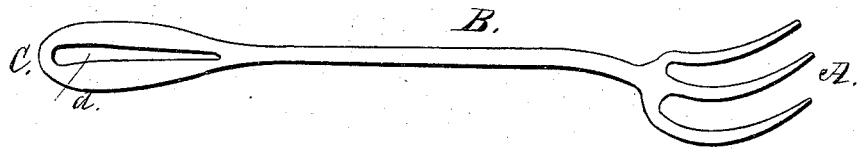
Fig: 3.
Witnesses:
John W. Miles
John W. Miles Jr.
Inventor:
Martin V. Trask

UNITED STATES PATENT OFFICE.

MARTIN V. TRASK, OF MERIDEN, CONNECTICUT, ASSIGNOR TO PARKER & PERKINS, OF SAME PLACE.

IMPROVEMENT IN MANUFACTURING FLESH HOOKS AND FORKS.

Specification forming part of Letters Patent No. 39,534, dated August 11, 1863.

*To all whom it may concern:*

Be it known that I, MARTIN V. TRASK, of Meriden, in the county of New Haven and State of Connecticut, have invented a new and useful Improvement in Flesh Hooks and Forks; and I do hereby declare that the following is a full, clear, and exact description of the construction and operation of the same, reference being had to the accompanying drawings, forming a part of this specification, in which—

Figure 1 is a top view representing the article as first cast and drawn from the sand. Fig. 2 is a side view of the same as bent into a flesh-hook; and Fig. 3 is a perspective view of a fork, the shank B of which, after being rendered malleable, has been twisted one-quarter round, so as to bring the broad, flat part of the handle C parallel with a tine passing through the points of the tines A.

Like parts are indicated by the same letters in all the drawings.

The handles of flesh hooks and forks have hitherto been made of wood and driven onto the shank B, but such handles are liable to split and come off. Handles have also been made of metal—a simple, straight, flat continuation of the shank B—but such handles are not so strong or convenient as handles constructed like mine.

The nature of my improvement, therefore, consists, first, in casting in one piece with the tines A and shank B a hollow handle, C, substantially as hereinafter described, whereby I produce a cheaper, stronger, and better article of its kind than known or used before; and, second, in casting the handle C and shank B in one piece, and (after the casting is rendered malleable) giving said shank a quarter-twist, so as to bring the flat broad part of the handle C parallel with a line passing through the ends of the tines A, which arrangement of the handle affords a better bearing-surface in the hand of a person lifting any article on the tines than is afforded by the handle shaped as shown in Fig. 1 before the quarter-twist is given to the shank.

To enable others skilled in the art to make and use my improvement, I will now proceed to describe its construction and operation.

I make my forks and hooks of malleable cast-iron, of any size and shape in general use, and with any usual number of tines.

The pattern from which the casting is made is shaped as shown in Fig. 1, the tines A being straight and the two sides of the hollow handle C being parallel with the tines, so that the pattern may be readily molded and drawn from the sand, which (owing to the hole $d$) could not be done if the shank were twisted one-quarter round, as represented in Fig. 3. After the casting has been rendered malleable, the tines A may be bent into any desirable shape, either to form a flesh-hook, as shown in Fig. 2, or a fork, as shown in Fig. 3. For a flesh-hook the shank and handle may remain in the shape in which it is cast; but for a fork, (and for the reason specified above,) I prefer to give the shank a quarter-twist, so that the broad flat side of the handle C may be parallel with a line passing through the points of the tines A. A handle thus constructed is as convenient and easy to hold as a round one of wood, while its greater durability and cheapness must be obvious to all.

Having thus described the construction and operation of my improvement, what I claim as new, and desire to secure by Letters Patent, is—

1. Casting in one piece, with the tines A and shank B of a flesh hook or fork a hollow handle, C, substantially as and for the purpose described.

2. Casting the handle C and shank B in one piece, and after the metal is rendered malleable giving said shank a quartert-wist, so as to bring the flat broad part of said handle parallel with a line passing through the points of the tines A, substantially as set forth, and for the purpose described.

MARTIN V. TRASK.

Witnesses:
JOHN W. MILES,
JOHN W. MILES, Jr.